US011567469B2

(12) United States Patent
Sanchez Navarro

(10) Patent No.: US 11,567,469 B2
(45) Date of Patent: Jan. 31, 2023

(54) PROCEDURE FOR CONTROLLING HOME APPLIANCES AND INSTALLATION FOR ITS IMPLEMENTATION

(71) Applicant: Nube Print, S.L., Madrid (ES)

(72) Inventor: Antonio Sanchez Navarro, Madrid (ES)

(73) Assignee: Nube Print, S.L., Madrid (ES)

( * ) Notice: Subject to any disclaimer, the term of this patent is extended or adjusted under 35 U.S.C. 154(b) by 0 days.

(21) Appl. No.: 17/672,358

(22) Filed: Feb. 15, 2022

(65) Prior Publication Data

US 2022/0171357 A1 Jun. 2, 2022

Related U.S. Application Data

(63) Continuation of application No. 16/619,533, filed as application No. PCT/ES2017/070557 on Jul. 31, 2017, now Pat. No. 11,307,545.

(51) Int. Cl.
*G05B 19/042* (2006.01)
*H04L 12/28* (2006.01)

(52) U.S. Cl.
CPC ........ *G05B 19/042* (2013.01); *H04L 12/2816* (2013.01); *H04L 12/2823* (2013.01); *G05B 2219/2642* (2013.01); *H04L 2012/285* (2013.01)

(58) Field of Classification Search
CPC .......... G05B 19/042; G05B 2219/2642; G05B 15/02; H04L 12/2816; H04L 12/2823; H04L 2012/285; H04L 12/2818; G06Q 10/20; G06F 11/004
See application file for complete search history.

(56) References Cited

U.S. PATENT DOCUMENTS

| | | | | |
|---|---|---|---|---|
| 2012/0316984 A1* | 12/2012 | Glassman | .............. | G06Q 50/06 705/26.7 |
| 2014/0214729 A1* | 7/2014 | Lin | ......................... | H04L 69/04 705/412 |
| 2016/0090678 A1* | 3/2016 | Rhode | ..................... | D06F 34/05 700/275 |

* cited by examiner

*Primary Examiner* — Tejal Gami
(74) *Attorney, Agent, or Firm* — McDonnell Boehnen Hulbert & Berghoff LLP

(57) ABSTRACT

A procedure and an installation for the control of home appliances that uses only the data that is necessary, avoiding saturation of the memories of the elements involved and/or the communications bandwidth. The procedure is simple and reliable so that it does not require the intervention of an expert user or a service person. The procedure includes the standardization of the data identifiers of each home appliance by identifying the identifier that contains a value for each data point and checking that the scale of each data point is equivalent to a predetermined scale. The installation includes a standardization system for such purpose.

19 Claims, 3 Drawing Sheets

PROCEDURE FOR CONTROLLING HOME APPLIANCES AND INSTALLATION FOR ITS IMPLEMENTATION

This non-provisional application is a continuation application of and claims priority to and benefit of U.S. patent application Ser. No. 16/619,533, filed on Dec. 5, 2019, which is the US National Phase Entry of and claims priority to and benefit of international application PCT/ES2017/070557, filed on Jul. 31, 2017, all herein incorporated by reference.

TECHNICAL FIELD OF THE INVENTION

The present invention falls within the field of the control of home appliances such as, for example, a dishwasher.

BACKGROUND OF THE INVENTION

A home appliance can be, for example, a washing machine, a dryer, a dishwasher, a hob, an extractor hood, an oven, an ironing station, a vacuum cleaner, a water purifying plant, a toilet, a machine that combines one or more of the above or any other known type of home appliance.

On the other hand, home appliances require a diversity of supplies of many types. The control and prediction of the requirements for providing said supplies is currently managed by a person, normally the user him/herself, and requires manual monitoring on his/her part. The acquisition of these supplies is currently decided by the user him/herself based on his/her own manual stock control. However, it is obvious that consumption can be associated with the use of the home appliance, thereby improving the management of supply needs based on the use of the home appliance in question. By way of example, the container of a laundry detergent indicates the theoretical or approximate of number of washes it contains. Therefore, a control system—procedure and installation—would make it possible to monitor the use of the device in order to determine the replacement needs of each supply required for its operation in a way that is better suited to the actual consumption.

Currently, some appliances are marketed with a connection system for sending data to remote equipment, which allows a person or system to know the status of the device in order to perform or schedule a technical intervention. Most home appliances directly or indirectly entail the consumption of a product (supply), which the user generally acquires in general shops such as a supermarket. For example: a washing machine requires, inter alia, laundry detergent for white fabrics, laundry detergent for coloured fabrics, fabric softener, limescale remover or bleach; a hob requires a specific cleaner and so on.

The current reality of the technology of most, if not all, home appliances is that they have been designed to remain operational without needing a service person, requiring only simple physical tasks that are mostly performed by the user. Any user may buy a supply, such as a detergent, without ever talking to a sales person or expert or service person, using an online shop, for example, and can use the supply following its own instructions. One consequence of this practice leads to the following well-known drawbacks: 1) the supply runs out either due to carelessness or to not sufficiently anticipating the need, and as a result the appliance cannot be used, with the consequent damage to its user; 2) the manufacturer indicates supply usage specifications that are often ignored, resulting in excessive consumption of, for example, detergent, with the resulting environmental impact due to the nature of these (highly polluting) supplies, causing serious maintenance problems in the sanitation networks of large cities, whose saturation is largely due to the clogging caused by excessive use of detergents.

The communication of the home appliance with other remote monitoring equipment is carried out directly and managed autonomously by the home appliance itself, which uses its communication module to send the data to a pre-programmed server via the LAN network belonging to the user of the home appliance. Drawbacks: this communication architecture poses a serious security problem, since each device must be provided with and keep updated its own data communication security and malware protection elements. Over time, it is known that devices become more vulnerable as malware technology evolves and the interest of the manufacturer of the home appliance in keeping the software of the home appliance updated decreases, due to its technological, although not functional, obsolescence. In fact, home appliances traditionally have a much longer useful life than other equipment with a high technological and software component such as PCs. Thus, according to industry experts, a washing machine is replaced every 12 years, although technological evolution with the introduction of computer technology in home appliances is forcing shorter replacement periods. Another drawback caused by this communication architecture is its effect on the LAN network to which the home appliances are connected. Since each device is allowed to manage its own communications, data circulation is beyond the user's control, generating serious damage due to excessive data traffic (a home appliance can have thousands of data elements), its lack of balance in communications, giving rise to an excessive and probably unnecessary cost of communications, and its saturation at specific times.

All of the above processes use data from the home appliances. Each data point has an identifier, a label, that allows the control or user to know which out of all the data points is of interest to them. However, given the large number of manufacturers and models, there are many data points and an even larger number of identifiers, which causes the aforementioned problem. It becomes necessary, as stated in the invention cited herein, to homogenise or standardise the data for better management, as explained below.

DESCRIPTION OF THE INVENTION

The present invention is established and characterised in the independent claims, while the dependent claims describe additional features thereof.

The subject matter of the invention is a procedure and an installation for the control of home appliances that uses only the data that is necessary, avoiding saturation of the memories of the elements involved and/or the communications bandwidth, which is simple, universal and reliable so that it does not require the intervention of an expert with knowledge of each device or a service person. The technical problem to be solved is that of determining the steps of the procedure and configuring the device to obtain the set objective.

In view of the above, the present invention relates to a procedure for the control of home appliances, which usually include supplies that must be replaced when they run out.

The home appliances communicate with a control device via a data collection device provided there between, i.e. there is real-time communication between the devices and their control device, which prevents updates of the data collection device, comprising the following steps as known in the prior art:
a) the data collection device sends a query to each home appliance regarding its category (for example, if it is a washing machine), its manufacturer, model and firmware version, normally on a regular basis,
b) each home appliance responds to the query in step a),
c) the data collection device queries the control device regarding the data it requires from each home appliance,
d) the control device responds to the query of step c),
e) the data collection device sends the response of step d) to each home appliance,
f) each home appliance sends a response to the response of step e) to the data collection device, and
g) the data collection device sends the response of step f) to the control device.

The procedure is characterised in that, during step g), in the response of step f) to the control device, the latter only receives the data it has requested; this significantly reduces data communication with respect to the usual practice in the state of the art, with a reduction of up to 98% or more.

The procedure is also characterised in that the control device comprises a standardisation system, which determines the data that must be gathered from each home appliance, which in turn comprises a standardisation unit to homogenise the data from each home appliance as explained below, a data supply unit, which rationalises data communication and uses the previous data standardisation, and a first storage unit connected to the standardisation unit. The control device also comprises a second storage unit.

The standardisation of the data is only carried out once for each manufacturer and model;

in other words, if a certain manufacturer model has already been standardised, standardisation does not take place. When the data received from step g) is not standardised, it is standardised when the standardisation unit is turned on according to the following steps:
h) from the data received in step g), the standardisation unit identifies the category, manufacturer and model of each home appliance and the data on the category, manufacturer and model are saved in the storage unit,
i) the standardisation unit, after step h), requests the profile of the category of each home appliance, and then the profile of the manufacturer of this category via the data collection device, which is saved in a second storage unit; the manufacturer's profile contains at least one identifier for each data point, and it is common to request all the identifiers even despite this not being necessary, and thus the manufacturer's profile is like a list of data points and each data point is identified by its identifier, which is unique and is the one that the home appliance that issues it understands,
j) each home appliance, via the data collection device, responds to the request of step i) and this can produce three outcomes: that the identifier exists and has a value, the identifier exists and has no value, and that the identifier does not exist; hereinafter, the identifier is considered to exist and to have a value,
k) after step j), the standardisation unit requests data based on the data identifiers from each home appliance via the data collection device,
l) each home appliance responds to the request of step k) via the data collection device,
m) the data received from step l) are saved in the first storage unit,
n) the standardisation unit, from the data of step m), identifies which identifier contains a value for its data point and checks that the scale of the data is equivalent to a predetermined scale, i.e. it contrasts the values obtained for each identifier and disregards any illogical ones; for example, if the data point is "cycle counter" and the value of an identifier is alphabetic, that identifier is discarded as valid for that model and that data point; this operation is repeated until all but one of the identifiers used according to the manufacturer's profile and for each data point have been discarded and, once reduced to a single identifier, the system verifies the degree of homogeneity of each data point by checking the scale, or in other words, the standardisation is performed by considering two different but complementary criteria according to the specific data point: a first criterion is based on the structure of the value, such as, for example, an IP address: v.x.y.z, wherein v, x, y and z are numbers with values comprised between 0 and 254, and therefore the standardisation unit, when obtaining in step f) several responses for several identifiers, will select via known data comparison processes the identifier for which the value obtained is consistent with the expected value; and this is performed for all the data required to complete the profile of the model, except for supply data; the second criterion is used to identify the correct identifiers for each data point of the supplies for the model; for example, depending on the manufacturer, there may be one or several possible identifiers; in step f) multiple responses are gathered and the standardisation unit discards any that lie outside the range specified in the manufacturer's profile, recording in the model profile the identifiers in which a non-discarded value has been obtained according to the previous criterion; as an option and according to claim 3, a user can perform a final check to discard any indicators that might have passed the previous filter but do not provide any relevant data for the data point to be assessed in the model profile,
o) the identifiers of each of value are saved in the first storage unit as a model profile for each home appliance, discarding the rest of the identifiers so that the model profile contains at most one unique identifier for each data point existing in the profile.

Steps h) to o) take place when the data are not standardised. It is thus implicitly stated that if the data are standardised, which is the least common situation, steps h) to o) do not take place; however, with regard to the procedure and the corresponding installation, the remaining steps and elements are valid as stated in detail in the detailed description.

Likewise, the invention relates to an installation for the control of home appliances, comprising a control device connected thereto via a data collection device provided between the two, as is known in the prior art.

The control device is characterised in that it comprises a standardisation system that in turn comprises a standardisation unit connected to a first storage unit and a data supply unit, such that the standardisation unit standardises the data to certain predetermined minimum values.

The main advantage of the procedure and installation is linked to the objective sought, since both use only the necessary (and homogeneous) data between different home appliances regardless of the model or manufacturer, and the steps and configuration are simple and reliable, and entail a relatively low cost.

Another advantage is that the various data protection regulations and specifically the EU's GDPR (General Data Protection Regulation) can be fulfilled, since it avoids collecting data from "natural persons".

Other advantages related to features of the dependent claims are indicated in the detailed explanation.

BRIEF DESCRIPTION OF THE DRAWINGS

The present specification is supplemented with a set of drawings that illustrate the preferred embodiment, which are never intended to limit the invention.

DETAILED DESCRIPTION OF THE INVENTION

What follows is a description of an embodiment of the invention, making reference to the figures.

Figure 1:
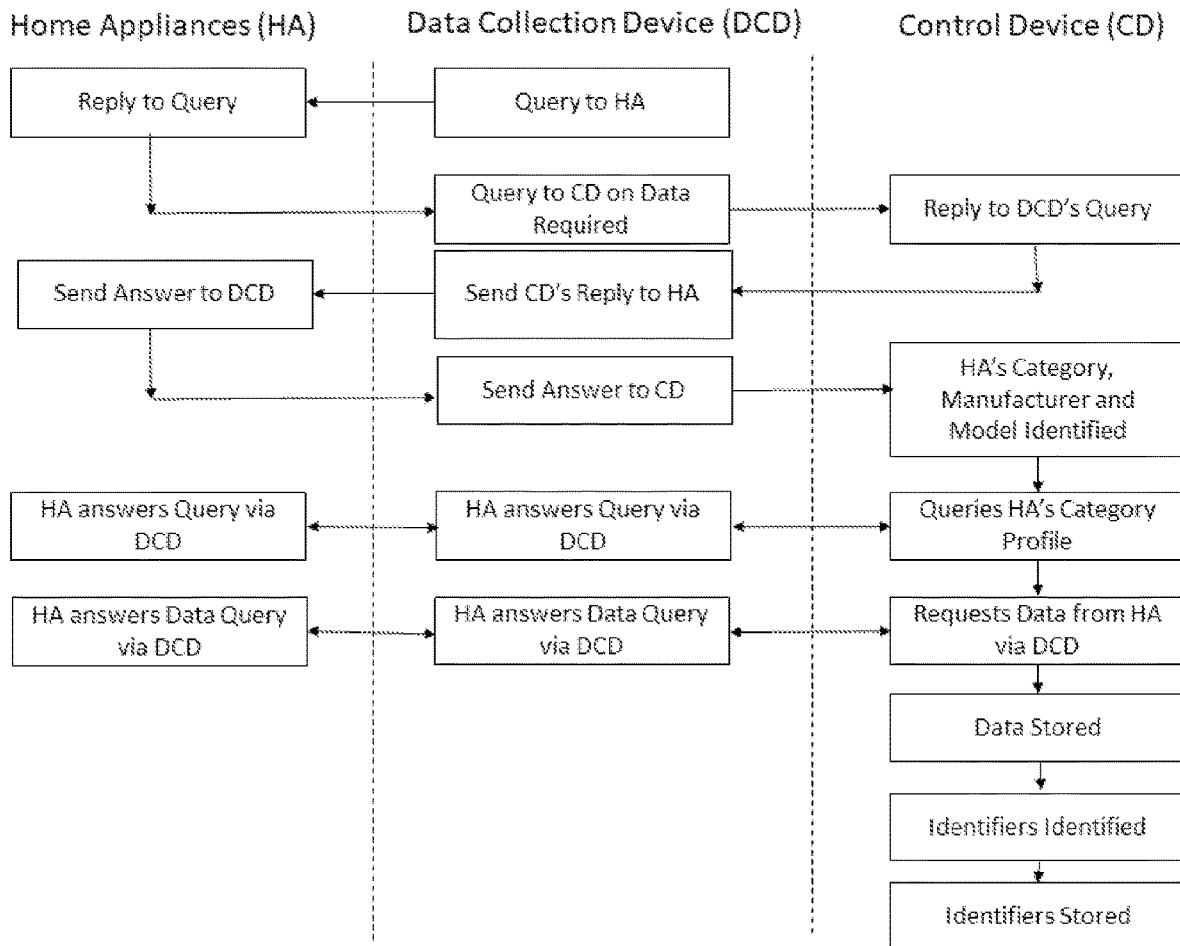
FIG. 1 shows a diagram of the standardisation procedure.
Figure 3:
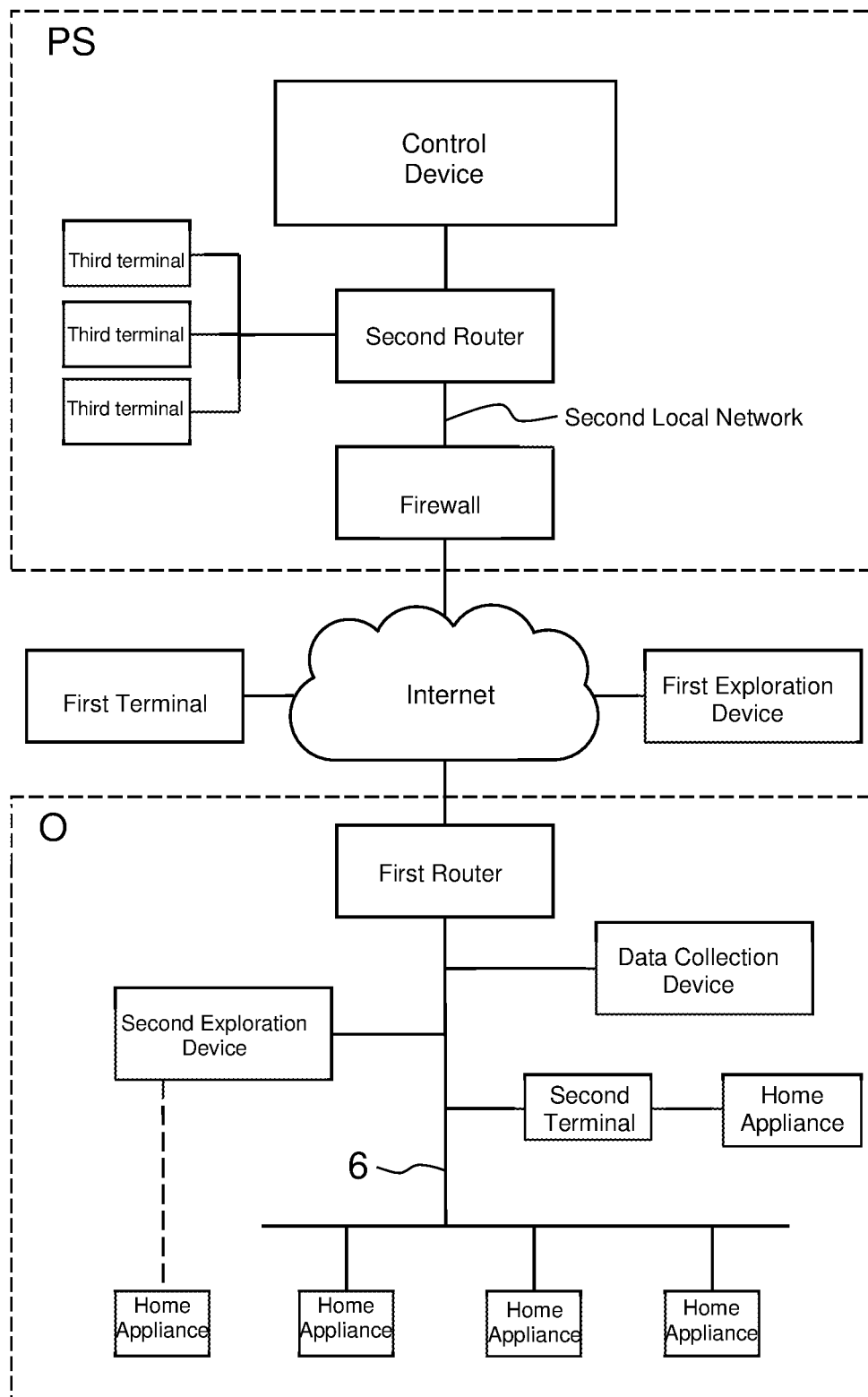
FIG. 3 shows a diagram of the entire installation.

FIG. 1 shows a procedure for the control of home appliances (1), wherein said devices (1) communicate with a control device (3) via a data collection device (2) provided between the two; these elements are shown in FIG. 3. The home appliances (1) can be, for example, a washing machine, a dishwasher, a hob, an extractor hood, an oven, an ironing station, a vacuum cleaner, a water purifying plant, a toilet or any other known home appliance.

The procedure shown in FIG. 1 comprises the following steps, which are shown in different columns depending on the device that performs them: home appliance (1), data collection device (2), control device (3):

a) the data collection device (2) queries each home appliance (1) on its category, manufacturer, model and firmware version,
b) each home appliance (1) responds to the query of step a),
c) the data collection device (2) queries the control device (3) regarding the data it requires from each home appliance (1),
d) the control device (3) responds to the query of step c),
e) the data collection device (2) sends the response of step d) to each home appliance (1),
f) each home appliance (1) responds to the response of step e) to the data collection device (2), and
g) the data collection device (2) sends the response of step f) to the control device (3).

In the response of step f) to the control device (3), the latter only receives the data that it has requested.

The control device (3) comprises a standardisation system (3.1), which in turn comprises a standardisation unit (3.2), a data supply unit (3.3), a first storage unit (3.4) connected to the standardisation unit (3.2); the control device (3) also comprises a second storage unit (3.5); when the data received from step g) are not standardised, they are standardised by the standardisation unit (3.2) according to the following steps:

h) from the data received from step g), the standardisation unit (3.2) identifies the category, manufacturer and model of each home appliance (1) and the category, manufacturer and model data are saved in the first storage unit (3.4),
i) the standardisation unit (3.2), after step h), requests the category profile and, within the category, the manufacturer of each home appliance (1) via the data collection device (2), which is saved in a second storage unit (3.5); the manufacturer's profile contains at least one identifier for each one of the data points,
j) each home appliance (1) responds to the request of step i) via the data collection device (2),
k) the standardisation unit (3.2) after step j) requests data based on the data identifiers from each home appliance (1) via the data collection device (2),
l) each home appliance (1) responds to the request of step k) via the data collection device (2),
m) the data received from step l) are saved in the first storage unit (3.4),
n) the standardisation unit (3.2), from the data of step m), identifies which identifier contains a value for its data and checks that the scale of the data is equivalent to a predetermined scale,
o) the identifiers for each of its values are saved in the first storage unit (3.4) as a model profile for each home appliance (1).

Preferably, if the scale of the data from step n) is not equivalent, the standardisation unit (3.2) applies a first algorithm, of several available, since new algorithms are usually being generated constantly to cover each specific case, in order to approximate said scale to the predetermined scale. The value used in the data point is thus standardised via a first algorithm: $V_n = L_n - FC$, wherein $V_n$ is the standardised value of the identifier at the time n of the reading, $L_n$ is the level of the supply corresponding to the relevant data taken at the time n, expressed as a percentage and gathered from the home appliance (1) in that same reading cycle, and FC is the correction factor, which is calculated in different ways depending on the circumstances as explained below.

To determine the correction factor FC, when the value $L_n$ gathered from the home appliance (1) does not change over two or more consecutive readings performed in step f), the standardisation unit provides a value of FC using the following second algorithm: $FC_n = (C_n - C_{n-1}) \times (L_1 - L_{n-1})/(C_{n-1} C_1)$, and $FC = FC_n$ if $FC_n <= L_n$, and otherwise $FC = FM$, wherein FM is a value between 100 and 0 and recorded in the model profile by an expert user during the standardisation process of the home appliance model (1). A second variable for determining the calculation of the correction factor FC is when $L_n$ no longer has a value in its historical series recorded in the first storage unit (3.4) that is between 100 and 1, and then the standardisation unit (3.2) will provide a value of FC using the following third algorithm: $FC = (C_k - C_n) \times (V_{k-1} - L_1)/(C_k - C_1)$, wherein $C_k$ is the value of the counter at the time k at which $L_n$ no longer has a logical value as explained, $C_n$ is the value of the last available counter obtained from the home appliance (1) at the time n of the last reading cycle corresponding to step f), $C_k$ is the value of the available counter obtained from the home appliance (1) at the time k, $C_i$ is the value of the available counter obtained from the home appliance (1) at the time i when the supply corresponding to the data point being standardised was installed, $V_{k-1}$ is the standardised value of the level of the supply at the time before k at which $L_n$ no longer had a logical value, $L_i$ is the level of the supply corresponding to the relevant data taken at the time i at which the supply corresponding to the data point being standardised was installed.

In the event that an identifier is missing in the data received from step l), the value corresponding thereto is calculated via a fourth algorithm that is used when the supply consumption can be assumed to be linear based on the value of a counter associated with that supply: $V_n = ((C_n - C_i)/D) \times 100 \times Q$, wherein $V_n$ is the standardised value of the identifier at the time n of the reading, $C_n$ is the value of the counter gathered from the home appliance (1) in the same reading cycle, $C_i$ is the value of the same counter at the time when the supply corresponding to this identifier was installed in the home appliance (1), D is the durability measured on the same unit as the counter $C_i$ of the supply corresponding to the identifier, $Q_{n-1}$ is a correction coefficient that takes into account the historical durability experienced by the supply corresponding to the data point expressed in base 1; a code will be assigned the identifier that can be interpreted in order not to include this identifier in the response provided by the control device (3) in step d); similarly, if the identifier received from step l) does not contain a value, then it will be calculated via the previous algorithm, and a code will be assigned to the identifier that can be interpreted in order not to include this identifier in the response provided by the control device (3) in step d); the second standardisation algorithms, each corresponding to each of the identifier values, are saved in the first storage unit (3.4) as a model profile for each home appliance (1).

In the event that an identifier is missing in the data received from step l), the value corresponding to such identifier is calculated using a fifth algorithm that is used when supply consumption is not linear based on the value of a counter associated with that supply, but rather there are several sub-counters which together form the counter associated with that supply. For example, for a washing machine appliance that has quick wash, pre-wash, linen, etc., the fifth algorithm is as follows: $V_n=((C1_n-C1_i) \times G1+(C2_n-C2_i) \times G2+ \ldots +(CN_n-CN_i) \times GN)/KT \times 100 \times Q_{n-1}$, wherein $C1_n$ is the value of the sub-counter C1 in that same reading cycle, $C1_i$ is the value of that same sub-counter C1 at the time when the supply corresponding to this indicator was installed or refilled in the home appliance (1), $C2_n$ and $C2_i$ are the corresponding values of the sub-counter C2, and so on for each sub-counter up to the sub-counter CN, G1 is the consumption, measured in volume or weight, by each unit of the sub-counter C1, of the supply corresponding to this indicator, G2 is the consumption, measured in volume or weight, by each unit of the sub-counter C2, of that same supply, and so on with the volume or weight G for each sub-counter up to CN, KT is the volume or weight of the supply corresponding to this indicator when it is at its maximum capacity, and $Q_{n-1}$ is a correction coefficient that takes into account the historical durability of the supply corresponding to the data point expressed in base 1.

From now on, standardised data are used, which may have originated from steps h) to o) as described, or which might even be available by default without having gone through such steps.

The manufacturer's profile cited in step i) can be of several types, a common one being the following when the supply is a cartridge containing, for example, detergent for multiple washes in a washing machine, or containing salt for multiple wash cycles in a dishwasher, although the relationship between the data and the identifiers varies according to the model and manufacturer of the home appliance (1):

| Manufacturer: | |
|---|---|
| Data | Identifiers |
| Category | |
| Serial number | |
| MAC address | |
| Model | |
| Energy classification | |
| Approved water consumption | |
| Approved power consumption | |
| Firmware version | |
| Firmware date | |
| IP address | |
| Water consumption counter | |
| Power consumption counter | |
| Cycle counter | |
| Wash cycle counter (white clothes) | |
| Wash cycle counter (colour clothes) | |
| Wash cycle counter (with pre-wash) | |
| Wash cycle counter (wool) | |
| Wash cycle counter (sportswear) | |
| Wash cycle counter (delicates) | |
| Water consumption counter | |
| Cartridge level | |
| Detergent | |
| Limescale remover | |
| Fabric softener | |
| Bleach | |
| Inner filter | |
| Outer filter | |
| Display | |

One option is for a user to check the tolerance of each data identifier, providing any missing data identifiers based on his/her experience, thus completing all the identifiers existing in the model profile such that each and every one of them has a value that is consistent with the data for each identifier. This typically occurs before step m) when the data are processed. The user is normally someone with experience, who accesses the control device (3) for example via a third terminal (11) as shown later in the installation. A template similar to that of the manufacturer's profile when the supply is a cartridge is generally used, although with some additional fields as indicated in this example for a home appliance (1) of the washing machine type:

| Manufacturer:/Model: | | | | | | | |
|---|---|---|---|---|---|---|---|
| Data | Identifiers | Value | Scale | Standardised scale | Re-scaling | Algorithm | Standardised |
| Serial number or MAC | | | | | No | | |
| Model | | | | | No | | OK |
| Energy classification | | | | | No | | OK |
| Approved water consumption | | | | | No | | OK |

-continued

| Data | Identifiers | Value | Scale | Standardised scale | Rescaling | Algorithm | Standardised |
|---|---|---|---|---|---|---|---|
| Approved power consumption | | | | | No | | OK |
| Firmware version | | | | | | | |
| Firmware date | | | | | | | |
| IP address | | | | | | | |
| Water volume consumption counter | | | | | No | | OK |
| Power consumption | | | | | | | |
| Detergent cartridge level | | | | Full/ medium/ low | Yes | | |
| Fabric softener dispenser level | | | | % | | | |
| Limescale remover dispenser level | | | | % | | | |
| Bleach dispenser level | | | | % | | | |
| Display | | | | | No | | OK |

Another option is that, after step o), the data supply unit (3.3) identifies the profile of the standardised model and checks if there is a specific standardised profile for this specific home appliance (1), that is, that the profile contains a unique identifier that coincides with the serial number or MAC address (acronym for "Media Access Control" as an identifier of a device) of the home appliance (1). If so, it compares them with the firmware version collected in step a), and if they are the same, the data supply unit (3.3) identifies said profile; if they do not match, the data supply unit (3.3) identifies the most recent profile of the firmware collected in step a). The profile of the home appliance (1) has the peculiarity, with respect to the standardised model profile, that a user, previously or at any time, has introduced a specific and different algorithm for a specific data point into the standardised model profile. This solves the problem of using supplies in the home appliance (1) that have not been manufactured by the same manufacturer as the device itself and for which, therefore, the home appliance (1), when responding in step f), gives a response that would have been different had if been using the same supply manufactured by the same manufacturer as the home appliance (1).

Another option is that, prior to step a), the data collection device (2) scans the local network to which the home appliances (1) are connected in order to locate them according to known protocols, and thus communication only takes place with home appliances of the desired categories (1) and not with other types of devices, thereby avoiding an unnecessary flow of data; in the event that a home appliance (1) is not found in a network, a user may access its data via an interface and enter them manually into the control device (3).

Figure 2:
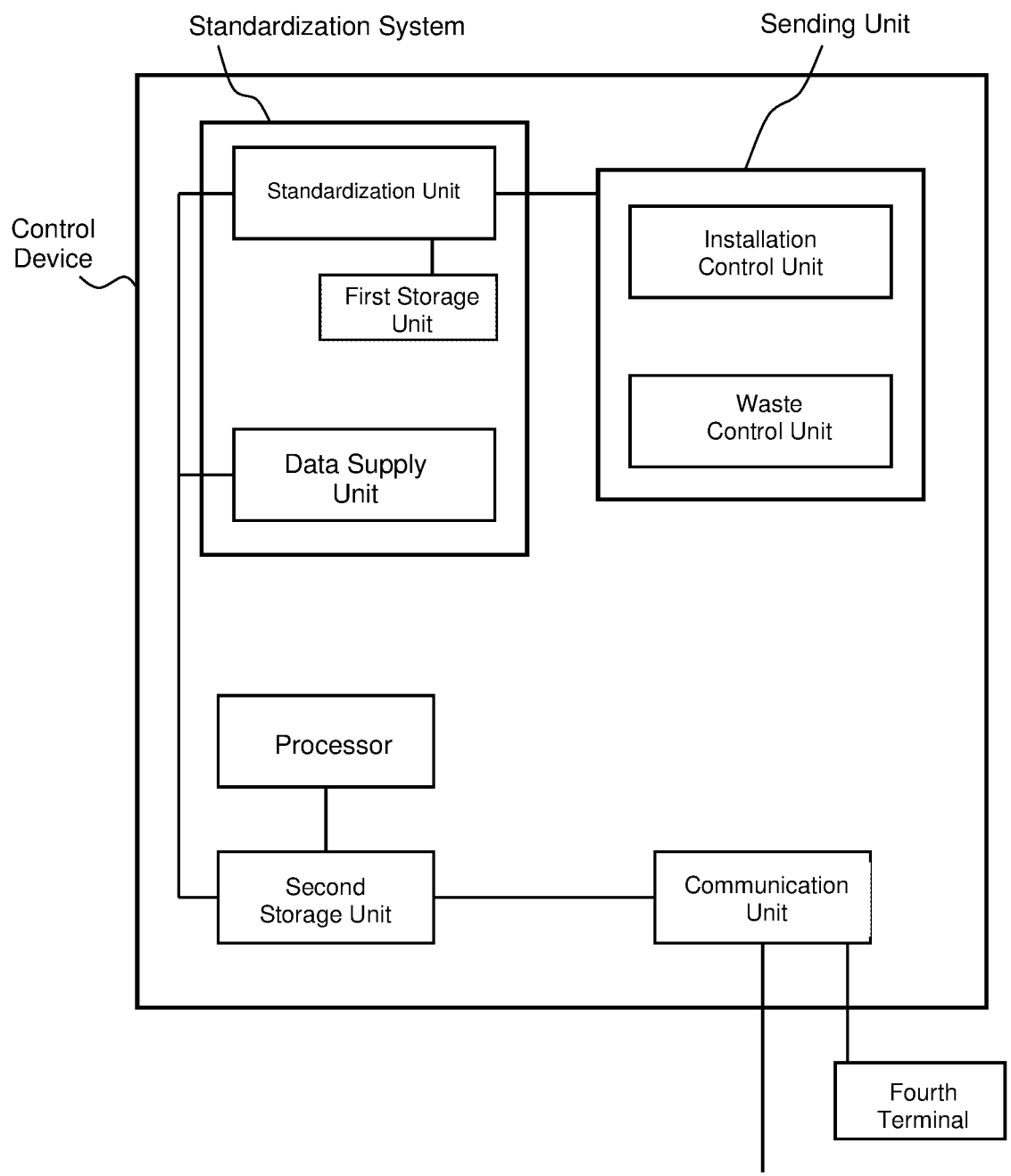
FIG. 2 shows a diagram of the installation, showing the control device in particular.

FIG. 2 shows an installation for the control of home appliances (1), which comprises a control device (3) connected to same via a data collection device (2) provided between the two; the control device (3) comprises a standardisation system (3.1) which in turn comprises a standardisation unit (3.2) connected to a first storage unit (3.4) and to a data supply unit (3.3), so that the standardisation unit (3.2) standardises the data to certain predetermined minimum values.

One option is for the control device (3) to also comprise a second storage unit (3.5) connected to a communication unit (3.6) and to a processor (3.7), all of which connected to the standardisation system (3.1), which in turn is connected to a sending unit (3.8), which in turn comprises an installation control unit (3.9) and a waste control unit (3.10). Optionally, a fourth terminal (3.11) can be connected to the communication unit (3.6).

The purpose of the installation control unit (3.9) is to automatically identify when a supply, which the control device (3) has identified as needing to be sent to replace another whose useful life is nearing completion, has been installed in the home appliance (1). This is important since home appliances (1) often require supplies that are completely replaced, and cannot be refilled by the user. Therefore, when a supply is replaced, the operating capacity remaining therein is wasted and this increases the cost of the activity, over a global operational calculation performed by the appliance device (1), and is also a source of $CO_2$ and other pollutants due to the non-optimal use. Furthermore, since the installation of supplies is mainly carried out by the user, it is impractical to expect the user to inform the control device (3) when they have performed said activity. Thus, the installation control unit (3.9) automatically identifies when a supply has been installed in the manner explained below.

Thus, after receiving the data of the home appliance (1) via the data collection device (2), the control device (3) records the data which were standardised using the model profile as explained above. Next, the installation control unit (3.9) checks if any alert records marked as "pending installation" were sent for any of the data of this home appliance (1) and, if there are any, checks the following:

Data value>VC×100, where Data value is the last standardised value recorded for the relevant data point and VC is a parameter between 1 and 0.5 indicated in the model profile corresponding to that home appliance (1). If the answer is "true", then the installation control unit (3.9) marks the alert as "installed" and activates the waste control unit (3.10). If the answer is "false", then the alert remains as "pending installation."

The waste control unit (3.10) can evaluate the waste that occurred when a supply in use was replaced by a new one. Thus, when an alert is marked "installed", the waste control unit (3.10) retrieves the last record with a standardised value from the data point prior to the time at which the alert is recorded as "installed", by applying the following sixth algorithm: Waste=$(C_{n+1}-C_n) \times (100-N_n)/(C_n-C_1)+(100-N_{n+1})$, wherein: $C_{n+1}$ is a counter of the home appliance (1) at the time of the last data reading, $C_n$ is a counter of the home appliance (1) at the time of the previous data reading, $N_n$ is the standardised level of the data point at the time of the data reading before last, $N_{n+1}$ is the standardised level of the data point at the time of the last data reading, $C_i$ is a counter of the home appliance (1) at the time of the installation of the supply that was just replaced, with a result equal to the waste in percentage (%) of supply wasted at the time of the replacement.

Another option is that the waste control unit (3.10) may collect the last record of the standardised value of the data point prior to the time at which the alert is recorded as "installed", applying the following seventh algorithm when the data point is use cycles: Wasted use cycles=$(Waste \times P_{imp})/(N_n-N_i)$, $P_{imp}=-C_n-C_i$, Waste=$(C_{n+1}-C_n) \times (100-N_n)/(C_n-C_i)+(100-N_{n+1})$, wherein: $C_{n+1}$ is a counter of the home appliance (1) at the time of the last data reading, $C_n$ is a counter of the home appliance (1) at the time of the data reading before last, $N_n$ is the standardised level of the data point at the time of the data reading before last, $N_{n+1}$ is the standardised level of the data point at the time of the last data reading, $N_i$ is the standardised level of the data point at the time of installation of the supply (cartridge) that was just replaced, $C_i$ is a counter of the home appliance (1) at the time of installation of the supply that was just replaced, resulting in the number of wasted use cycles that the appliance (1) could have carried out had the supply not been replaced at the time n and if it had been replaced when it was truly empty.

Another option is for the waste control unit (3.10) regularly to check the actual consumption of the supplies and to use this information to determine consumption deviations that are higher than those considered normal. This has the following advantages: 1) when the supply is a polluting product (such as a detergent) or a product which it is desirable to save (such as water or kW/h), this check allows the problem to be identified in time to remedy the cause and avoid spills or greater consumption than necessary; 2) when the supply is a self-maintaining part (such as a filter that the user can clean by his/her own means), this check makes it possible to indicate whether there is a cause that abnormally accelerates its wear by decreasing its life cycle, which should allow the cause to be corrected easily and to return the life cycle value to its usual value; 3) in any case, this check has a considerable positive economic effect since it optimises consumption; and 4) this check makes it possible to establish consumption or environmental impact parameters to be used by service companies (such as the water supply company or the water treatment company) or public authorities to calculate the real cost of their services or environmental fees.

This is done using an eighth algorithm as follows: CR/C=EEoM, comparing EEoM with EMH including its tolerance, i.e. the EEoM result is associated with a value according to an equivalence table that indicates energy or environmental efficiency in relation to EMH.

Wherein EEoM is the energy efficiency or actual classification level, EMH is the approved classification level, CR is the actual consumption during the period between the dates "n" and "i", C is the number of cycles of total use during the period between the same dates "n" and "i" and calculated as C=$(C1_n-C1_i)+(C2_n-C2_i)+ \ldots +(CN_n-CN_i)$, wherein C1, C2 and CN are the value of the use cycle counter for use cycle types 1, 2 and N, respectively; CH is the approved consumption for each supply and/or water and/or power.

The actual consumption per work cycle for each supply is compared with the expected consumption, and the water and power consumption are compared with the approved consumption for each one respectively, which is included in the model profile. The result is compared with tolerance parameters recorded in a table containing the following data on energy efficiency and environmental efficiency for each type of device: approved classification level (EMH), minimum and/or maximum power consumption and/or minimum and/or maximum water consumption. The waste control unit (3.10) determines the actual energy classification level by searching the above table for the classification that corresponds to the actual measured consumption of water, power and/or each supply. The result is recorded in the first storage unit (3.4) as energy or environmental efficiency (EEoM) associated with a specific home appliance (1) and a specific time period, which are also recorded in the first storage unit (3.4). When the actual EEoM classification level calculated differs from and is worse than the approved classification level (EMH) for said model, the details of which are on the model sheet, then the waste control unit (3.10) generates an alert that is recorded in the first storage unit (3.4).

Preferably, and as usual, the control device (3) and the data collection device (2) are connected over the internet (I).

Another option of the installation is for a first exploration device (4) and/or a first terminal (5) to be connected to the control device (3) and the data collection device (2) over the internet (I). This first exploration device (4) and first terminal (5) have the advantage that they are arranged outside any local network and communicate with the control device (3) over the internet (I).

Preferably, the home appliances (1) and the data collection device (2) are connected to one another via a first local network (6). In this way, with a common network they can access the control device (3) over the internet (I).

One option is for a second exploration device (7) to be connected to the first local network (6). Specifically, and as an alternative to the aforementioned first local network (6), a home appliance (1) is connected to the second exploration device (7) over the internet (I). These are known as offline appliances, shown by a dashed line in FIG. 3. This is advantageous when the home appliance (1) does not have access to the first local network (6). Specifically, a user may access the appliance (1) via a suitable interface (keyboard, screen, etc.) and even by scanning a QR code, accessing a list of data that can be completed. This is especially useful in appliances that do not have a local network (6) connection, and it can be done by any user, without having to be an expert. One advantageous option is for the access to be to a site that includes online technical support, as well as the possibility of requesting a supply via this channel, and then the control device (3) records the request and prevents the sending from being duplicated if, for example, another user performs the same request, and it can also include counters for supply consumption, such as the number of washes or the percentage of a detergent cartridge.

Another alternative is for a home appliance (1) to be connected to the first local network (6) via a second terminal (8), which communicates with the control device (3) for data entry, queries and the functionalities allowed.

Optionally, the internet (I) connection of the data collection device (2) is performed through a first router (9) and the internet (I) connection of the control device (3) is performed through a second router (10). In addition, a third terminal (11) and optionally a firewall (12) can be connected to said second router (10), which together protect the data flow from undesirable external attacks.

The control device (3) and/or the first router (9), the third terminal (11) and the firewall (12) can be connected via a second local network (13) such that together they form what is usually called the service provider, "PS" in FIG. 3.

In relation to the aforementioned collection of actual EEoM classification level data, a user can access said data recorded in the first storage unit (3.4) via the appropriate interface (keyboard, screen, etc.) as cited, i.e. via a first terminal (5) arranged outside any local network and communicating with the control device (3) over the internet (I) or by connecting to the first local network (6) directly from the home appliance (1), via a second terminal (8), or via a second exploration device (7) over the internet (I).

During operation, the control device (3) logs the records of the standardised data for each of the home appliances (1). The logs include the date, hour, minute and seconds at which the values are received in the control device (3) via the data collection device (2). Periodically, multiple times a day and at most once for each time the data are received and standardised, the sending unit (3.8) identifies the forthcoming needs of the home appliance (1). The detailed identification is explained in detail below, and here we will provide a brief description mentioning some of the elements of the installation involved: when the standardised value of a data point exceeds a predetermined threshold value, previously set and entered by an operator using a third terminal (11), the sending unit (3.8) generates an alert indicating that this data point has reached the threshold value. The alert is then recorded in the first storage unit (3.4), indicating the date, hour, minute and second thereof, as well as the value of the data point at that time, and its status is marked as "pending installation". If, when the previous criterion that the value of the data point has reached or exceeded the threshold value is met, there is a prior alert and it has "pending installation" status, then the sending unit (3.8) does not perform any action. In this way the control device (3) is guaranteed to only notify once when a supply is required, ensuring that no duplicate supplies are sent, which is very common in other solutions provided in the industry. As a result of the above, the sending of supplies can be automated by sending the data of the supply required by a certain home appliances (1) to an external delivery management system, thereby achieving a great reduction in the time spent managing the purchase of supplies and an increase in the control of resources, such as detergent, that are sent to each home appliance (1).

In one variant, the sending alert occurs when a standardised data point of a certain home appliance (1), previously converted by the sending unit (3.8) to a value expressed in time units (weeks, days, hours, minutes and seconds) reaches a threshold that the operator has previously entered in "time remaining" units. The operation is as follows: The system records the log of standardised data for each of the home appliances (1), the logs including the date, hour, minute and seconds at which the values are received in the control device (3) via the data collection device (2). Periodically, multiple times a day and at most once each time the data are received and standardised, the sending unit (3.8) performs prediction calculations for the evolution of consumption for each supply of the home appliance (1), this prediction being made using the different time stamps and applying a ninth algorithm that accounts for possible changes in the rate of use of home appliances (1). The advantage of this solution is that it reduces the risk of unusual behaviour of the home appliance (1) altering the prediction of usage time remaining, for example, of the number of washes remaining in each detergent cartridge, which is what happens when a linear prediction is made, as in other known solutions. The ninth algorithm is as follows: $TR=(L_n \times d)/(|L_n-L_{n-d}|) \times 1/FC_n$  $FC=((C_n-C_{n-D})/D)/((C_n-C_{n-d})/d)$, wherein $FC_n=1$ if $FC<1$, $FC_n=FC$ if $FC_n$ is the correction factor at time "n" of the alert, TR is the time remaining, $L_n$ is the standardised value of the level of the data point (level of the relevant supply) at time "n" of the alert, $L_{n-d}$ is the standardised value of the level of the data point (level of the relevant supply) at time "n" of the alert minus a period of time "d", $C_n$ is the counter of the home appliance collected at time "n" of the alert, $C_{n-d}$ is the counter of the home appliance collected at time "n" of the alert minus the period of time "d", $C_{n-D}$ is the counter of the home appliance collected at time "n" of the alert minus the period of time "D", d is the period of time (expressed in any time unit such as weeks or days, hours, minutes, etc.), D is the period of time (expressed in any time unit such as weeks or days, hours, minutes, etc.) and D is always greater than d.

In another variant, the sending alert occurs when a standardised data point for a certain home appliance (1), previously converted by the sending unit (3.8) to a value expressed in "remaining use cycles", reaches a threshold that an operator has entered in "cycles performed" units. The operation is as follows: the log of standardised data for each of the home appliances (1) is recorded, the logs including the date, hour, minute and seconds at which the values are received in the control device (3) via the data collection device (2), as well as the value of the counter or counters at that time. Periodically, multiple times a day and at most once each time the data are received and standardised, the sending unit (3.8) performs prediction calculations for the evolution of consumption for each supply of the home appliance (1), this prediction being carried out using the different time stamps and applying a tenth algorithm that accounts for possible changes in the rate of use of the home appliances (1). The advantage of this solution is that it reduces the risk of unusual behaviour of the home appliance (1) altering the prediction of the remaining printing capacity of each supply. Furthermore, this method may replace the one indicated above, which is based on "time remaining", or complement it to improve the process of sending supplies to home appliances (1) subject to intensive use. The tenth algorithm is the following when the home appliance (1) is a washing machine and the data point is washing cycles: Cycles Expected=$(L_d \times (C_n - C_{n-d})/|L_d - L_{n-d}|$, wherein $L_n$ is the standardised value of the level of the data point (level of the relevant supply) at time "n" of the alert, $C_n$ is a counter of home appliance cycles collected at time "n" of the alert, $C_{n-d}$ is a counter of home appliance cycles collected at time "n" of the alert minus a period of time "d", $L_{n-d}$ is a standardised value of the level of the data point (level of the relevant supply) at time "n" of the alert minus a period of time "d".

The home appliances (1) and the data collection device (2) that are connected to one another via a first local network (6) form, together with other nearby devices: the first router (9), the second exploration device (7), the second terminal (8), which is usually considered the operator for the home appliances (1), "O" in FIG. 3.

The components of the aforementioned elements are standard and have the usual capabilities. For example, a home appliance (1) comprises a communication unit, a data storage unit, a processor and supplies: detergent, filter, limescale remover, etc.; the data collection device (2) comprises a communication unit, a data storage unit and a processor; a exploration device (4, 7) comprises a communication unit, a data storage unit, a processor, an interface (screen, keyboard) and a camera.

Optionally, the home appliance may comprise a display and/or set of light indicators and/or a loudspeaker with an audio modulator which act as an interface for communicating visually or audibly with the user of the home appliance (1). Thus, this user interface of the home appliance (1) displays information regarding the state of the supplies of the home appliance (1) calculated and sent by the control device (3), in the form of messages and alerts as set forth in the explanation of the invention, such as alerts of forthcoming needs (remaining level of each supply, delivery status of a supply to replace the current one, expected date or agreed date for a technical inspection, excessive consumption, etc.), wasted supply, wasted use cycles, actual supply consumption, and energy or environmental efficiency (EEoM), as well as various recommendations.

Common access permissions are used for the procedure and the installation, and it is advantageous to use a single data collection device (2) so that these permissions are centralised therein, and thus if a home appliance (1) is removed from the installation and/or a new one is added, this can be done in a simple manner by acting only on the data collection device (2), unlike when there is one for each home appliance (1), which requires individual action, which is complex and very time-consuming.

The following is a list of possible supplies according to the category of the home appliance (1):

| Category | Supply | Category | Supply |
|---|---|---|---|
| Washing machine | Detergent<br>White laundry detergent<br>Colour laundry detergent<br>Fabric softener<br>Limescale remover<br>Bleach<br>Filter A<br>Filter B<br>Belt<br>Rubber door seal | Vacuum cleaner | Filter A<br>Filter B<br>Filter C<br>Filter D<br>Odorant supply |
| | | Ironing station | Water<br>Filter A<br>Filter B<br>Limescale remover<br>Odorant supply |
| Dryer | Filter A<br>Filter B<br>Filter C . . . | Dishwasher | Detergent<br>Salt<br>Rinse aid<br>Odorant supply<br>Detergent |
| Toilet | Detergent<br>Odorant supply<br>Compressed air<br>Filter A<br>Filter B | Hob | |
| Oven | Water<br>Detergent | | |
| Extractor hood | Filter A<br>Filter B<br>Filter C . . . | | |
| Water purification system | Filter A<br>Filter B<br>Filter C . . .<br>Reagent A<br>Reagent B<br>Reagent C . . .<br>Membrane A<br>Membrane B<br>Membrane C ... | | |

The following is a list of the possible counters according to the home appliance category:

| Category | Counter | Category | Counter |
|---|---|---|---|
| Washing machine | Water consumption<br>Power consumption<br>Wash cycles<br>Type A wash cycles<br>Type B wash cycles<br>Wash cycles for each type of cycle<br>Spin<br>Use time | Oven | Power consumption<br>Type A cooking cycles<br>Type B cooking cycles<br>Type C cooking cycles . . .<br>Use time<br>Water consumption |
| Dryer | Power consumption<br>Drying cycles<br>Type A drying cycles<br>Type B drying cycles<br>Drying cycles for each type of cycle<br>Use time<br>Volume of water recovered | Water purification system | Litres used<br>Use time<br>Power consumption |
| | | Vacuum cleaner | Power consumption<br>Distance travelled<br>Use time |
| | | Ironing station | Ironing cycles<br>Use time<br>Water consumption<br>Power consumption |
| Toilet | Water consumption<br>Power consumption | Dishwasher | Water consumption<br>Power consumption<br>Type A wash cycles<br>Type B wash cycles<br>Wash cycles for each type of cycle<br>Use time |
| Toilet | Type A use cycles<br>Type B use cycles<br>Type C use cycles<br>Use time | | |
| Extractor hood | Power consumption<br>Use time | | |
| | | Hob | Use cycles<br>Power consumption |

What is claimed:

1. An installation for controlling home appliances comprising a control device connected to said home appliances via a data collection device provided between them both, characterized in that the control device comprises a standardization system which in turn comprises a standardization unit connected to a first storage unit and to a data supply unit, wherein the control device further comprises a second storage unit connected to a communication unit and to a processor, all of which are connected to the standardization system, which is in turn connected to a sending unit, which in turn comprises an installation control unit and a waste control unit, and the installation being configured to execute the steps:

a) the data collection device queries each home appliance on its manufacturer, model and firmware version,
b) each home appliance responds to the query of step a),
c) the data collection device queries the control device regarding the data it requires from each home appliance,
d) the control device responds to the query of step c),
e) the data collection device sends the response of step d) to each home appliance,
f) each home appliance responds to the response of step e) to the data collection device, and
g) the data collection device sends the response of step f) to the control device, characterized in that, in the response of step f) to the control device, the latter only receives the data it has requested; the data received from step f) are saved in the first storage unit; when the data received from step g) are not standardized, they are standardized by the standardization unit according to the following steps:
h) from the data received from step g), the standardization unit identifies the category, manufacturer and model of each home appliance and the category, manufacturer and model data are saved in the first storage unit,
i) the standardization unit after step h) requests the category and manufacturer's profile of each home appliance which are saved in the second storage unit; the manufacturer's profile contains at least one identifier for each of the data points,
j) the standardization unit, from the data of step g), identifies which identifier contains a value for its data and checks that the scale of the data is equivalent to a predetermined scale,
k) the identifiers for each of its values are saved in the first storage unit as values of a model profile for each home appliance;

wherein in the event that an identifier is missing in the data received from step f) and supply consumption is non-linear based on the value of several sub-counters which jointly form the counter associated with that supply, said identifier is calculated using a fifth algorithm: $V_n = ((C1_n - C1_i) \times G1 + (C2_n - C2_i) \times G2 + \ldots + (CNn - Cni) \times GN)/KT \times 100 \times Qn--$, wherein $C1_n$ is the value of the sub-counter C1 in that same reading cycle, $C1_i$ is the value of that same sub-counter C1 at the time when the supply corresponding to this indicator was installed or refilled in the home appliance, $C2_n$ and $C2_i$ are the corresponding values of the sub-counter C2, and so on for each sub-counter up to the sub-counter CN, G1 is the consumption, measured in volume or weight, by each unit of the sub-counter C1, of the supply corresponding to this indicator, G2 is the consumption, measured in volume or weight, by each unit of the sub-counter C2, of that same supply, and so on with the volume or weight G for each sub-counter up to CN, KT is the volume or weight of the supply corresponding to this indicator when it is at its maximum capacity, and $Qn-1$ is a correction coefficient that takes into account the historical durability of the supply corresponding to the data point expressed in base 1.

2. The installation according to claim 1, wherein the control device and the data collection device are connected over the internet (I).

3. The installation according to claim 2, wherein the home appliances and the data collection device are connected to one another via a first local network.

4. The installation according to claim 3, wherein a second exploration device is connected to the first local network.

5. The installation according to claim 4, wherein a home appliance is connected to the second exploration device over the internet (I).

6. The installation according to claim 3, wherein a home appliance is connected to the first local network via a second terminal.

7. The installation according to claim 3, wherein a first exploration device is connected to the control device and to the data collection device over the internet (I).

8. The installation according to claim 7, wherein a second exploration device is connected to the first local network.

9. The installation according to claim 8, wherein a home appliance is connected to the second exploration device over the internet (I).

10. The installation according to claim 7, wherein a home appliance is connected to the first local network via a second terminal.

11. The installation according to claim 3, wherein a first terminal is connected to the control device and to the data collection device over the internet (I).

12. The installation according to claim 11, wherein a second exploration device is connected to the first local network.

13. The installation according to claim 12, wherein a home appliance is connected to the second exploration device over the internet (I).

14. The installation according to claim 11, wherein a home appliance is connected to the first local network via a second terminal.

15. The installation according to claim 1, wherein the internet (I) connection of the data collection device is performed through a first router and the internet (I) connection of the control device is performed through a second router.

16. The installation according to claim 15, wherein a third terminal is connected to the second router.

17. The installation according to claim 1, wherein the home appliances are selected from a washing machine, a dryer, a dishwasher, a hob, an extractor hood, an oven, an ironing station, a vacuum cleaner, a water purifying plant or a toilet or a machine that combines one or more of the above.

18. The installation according to claim 1, wherein each home appliance includes an interface for communicating with the user, so that it can display a message selected from the following: alerts of forthcoming needs, wasted supply, wasted use cycles, actual supply consumption and energy or environmental efficiency (EEoM).

19. The installation according to claim 3, wherein a first exploration device and a first terminal are connected to the control device and to the data collection device over the internet (I).

* * * * *